United States Patent Office 3,711,453
Patented Jan. 16, 1973

3,711,453
RANDOM COPOLYMERS OF SULFUR DIOXIDE WITH ALLYL ETHER OF POLYOXYALKYLENE GLYCOLS
William Ross Moore, Lake Jackson, Tex., assignor to The Dow Chemical Company, Midland, Mich.
No Drawing. Filed Nov. 4, 1970, Ser. No. 86,947
Int. Cl. C08f 13/06
U.S. Cl. 260—79.3 A           5 Claims

ABSTRACT OF THE DISCLOSURE

Random copolymers of sulfur dioxide and allylic compounds such as monoallyl ethers of polyoxyalkylene glycols and a selected mixture of said monoallyl ethers with allyl alcohol wherein the mol ratio of allyl alcohol to said monoallyl ether ranges from about 1:2 to about 2:1. The copolymers are useful as adhesives and as polymeric surfactants.

BACKGROUND OF THE INVENTION

This invention relates to a resinous polysulfone which is the equimolar reaction product of sulfur dioxide and allylic compounds such as monoallyl ethers of polyoxyethylene glycols and a mixture of said monoallyl ethers with allyl alcohol wherein the mol ratio of allyl alcohol to said monoallyl ether ranges from about 1:2 to about 2:1.

It is known from U.S. Pat. 3,308,102 to B. W. Wilson that sulfur dioxide can be copolymerized with a mixture of sulfoethyl acrylic esters and their salts, a monoallyl ether of a polyoxyethylene glycol, and allyl alcohol to produce a flocculant.

It now has been surprisingly found that related sulfur dioxide copolymers without the sulfoethyl acrylic esters are useful as adhesives and polymeric surfactants.

SUMMARY OF THE INVENTION

It now has been found that random copolymers can be produced from the reaction of sulfur dioxide with allylic compounds such as the monoallyl ethers of polyoxyethylene glycols and polyoxypropylene glycols or with a mixture of the polyoxyethylene glycols with allyl alcohol wherein the mol ratio of allyl alcohol to said ether ranges from about 1:10 to about 1:0.5. The preferred range is from about 1:2 to about 1:1.

These copolymers are tacky and are useful as adhesives since it is cohesive when coated on a substrate and also adheres well to such diverse substrates such as glass, wax, coated paper, paper, metals, wood, and ceramics.

DETAILED DESCRIPTION

The random copolymers of this invention are made by the copolymerization of sulfur dioxide with commercially available monoallyl ethers of polyalkylene glycols with or without the presence of allyl alcohol.

If an allyl alcohol mixture is used, the mol ratio of the allyl alcohol to allyl glycol ether is critical since if a ratio more than about a one to ten mol ratio of allyl alcohol to ether is used the copolymers are water insoluble and not tacky whereas with a ratio less than about one to about a half (0.5) mol ratio is used the copolymers are humidity-sensitive i.e. they absorb atmospheric moisture and lose their adhesiveness.

The monoallyl ethers of polyalkylene glycols used in this invention, i.e. polyethylene glycols and polypropylene glycols, have an average molecular weight in the range from 150 to 1500. A preferred range for the polyethylene glycols is from 250 to 1000. A preferred range for the polypropylene glycols is from 175 to 1000. These monoallyl glycol ethers are readily obtained by the base catalyzed addition of ethylene oxide or propylene oxide to allyl alcohol in a conventional manner.

The copolymers of this invention are made by reacting the above monomers with sulfur dioxide in an inert organic solvent such as a lower alkanol, chlorinated aliphatic hydrocarbons or by a bulk polymerization technique. Examples of the solvents used are methanol, ethanol, 1,1,1-trichloroethane, and the like. The reaction does not appear to take place using water as the reaction medium as is illustrated in the latter part of Example 2.

In general, the process involves saturating the solvent or excess glycol ether with sulfur dioxide in a reaction flask. When using the solvent technique, the unsaturated monomer is added dropwise over a period of time ranging from one minute to 72 hours in the presence of a catalytic agent.

The polymerization must be effected with the aid of irradiation or a chemical catalyst. When irradiation is used, the amount can vary from about 0.02 to about 5.0 megarad. Gamma rays or high velocity electrons are satisfactory for use in this process. If desired, a chemical catalyst may be used to supplement the polymerization by irradiation. The chemical catalysts used herein comprise ionic type catalyst (such as silver nitrate, lithium nitrate and ammonium nitrate) and peroxide type free radical catalysts (such as methylethylketone peroxide and t-butylperoxy pivalate). When an ionic type catalyst is used, it is used in an amount from about 0.001 to 3 percent by weight based on the weight of the unsaturated monomer present. Similarly, when a free-radical catalyst is used the amount needed varies from about 0.05 to 5.0 percent based on the weight of the unsaturated monomer.

The temperature of the polymerization reaction can vary from −50° C. to 50° C. with the range from 0° C. to 30° C. being preferred. Normally, sufficient pressure is maintained on the reaction mixture to keep the contents in the liquid phase. However, the pressure can range from 1 to 100 pounds per square inch (gauge) (p.s.i.g.) with 1 to 20 p.s.i.g. being the preferred range. The molar ratio of the monomers can vary from 0.1 to 1 moles of sulfur dioxide to unsaturated monomer to 100:1 with a range from 1:1 to 10:1 being preferred.

The copolymer is soluble in the inert solvents used and is recovered by evaporation thereof.

The invention is illustrated and not limited by the following examples.

Example 1

A 16 ounce glass bottle was set up in an exhaust hood in a cold water bath. The bottle was charged with 200 mls. of butanol-1 and 150 mls. (0.303 mole) of Voranol AE 501 (a commercial grade of a monoallyl glycol ether made by the addition of 11 moles of ethylene oxide to allyl alcohol and having an average molecular weight of 500). The solution was saturated with $SO_2$ gas at 20° C. After 16 hours saturation, 2.0 g. of ammonium nitrate catalyst was added. A slight exotherm was observed; the $SO_2$ addition served as a source of agitation. Within two hours the solution became very thick. The viscous solution was freed of residual $SO_2$ by use of a Rinco Evaporator at 30 mm. Hg and 30° C. The final product was a clear, stringy, tacky solution of 37% solids. It adhered well to most common substrates such as glassware, steel panels, etc. but was very hygroscopic. The property of tack is very evident and it was found to be useful as an adhesive to bond paper to paper or paper to glass substrates. Gel Permeation Chromatography gave a 9,000 mol. wt. based on a polyglycol standard.

Infra-red analysis confirmed the proposed structure of a 1:1 mole ratio copolymer of allyl poly(EO) with $SO_2$; some residual unsaturated monomer was seen. The polymer decomposed at 188° C.

The polymer was soluble in alkanols, water, tetrahydrofuran, dimethylformamide, dimethyl sulfoxide, chloroform, acetone, p-dioxane, methanol, methyl chloroform and methylene chloride.

Example 2

A 3 liter resin kettle equipped with a stirrer was charged with 1000 mls. (2.0 moles) of the allyl ether compound of Example 1 and was then stirred and saturated with $SO_2$ at 21° C. The reactor was then charged with 10.9 g. of $NH_4NO_3$ dissolved in 10 mls. deionized distilled water. A slight exotherm was seen. After a 24 hour reaction period at the same temperature, the product was stripped free of residual $SO_2$ under vacuum. The product was a clear, viscous solution, very tacky in nature and very hygroscopic.

Infra-red analysis confirmed the proposed structure of a 1:1 mole ratio copolymer.

In the manner described above, a resin kettle was charged with 1400 mls. double distilled water and was then saturated with $SO_2$ at 21° C. A total of 500 mls. (1.0 mole) of the allyl ether of Example 1 was added directly to the pot contents. Within 1 minute 8.0 g. $NH_4NO_3$ (dissolved in 15 mls. double distilled water) was added to the reactor with stirring at 250 r.p.m. A slight exotherm was seen and the solution turned from clear to greenish-yellow with no polymer seen after 4½ hours. Another 8.0 g. of $NH_4NO_3$ was added directly to the stirred pot contents. After 24 hours reaction time the solution remained non-viscous and greenish-yellow with no polymer present. This shows that water cannot be used as the diluent.

Example 3

In the manner of Example 2 a three liter resin kettle was charged with 1000 mls. of denatured ethanol and 400 mls. (0.80 moles) of the allyl ether of Example 1 and was saturated with $SO_2$ at 20° C. The kettle was stirred at 250 r.p.m. and 5 mls. Lupersol 11 catalyst (75% tert-butyl peroxy pivalate in mineral spirits) was added dropwise to the solution. After 15 minutes reaction time, 0.40 moles allyl alcohol was added dropwise over a 15 minute period. A slight exotherm was seen and the viscosity increased noticeably. After 24 hours reaction time the polymer solution was stripped free of residual $SO_2$ under vacuum. The final product was a slightly hazy, viscous liquid, soluble in water and tacky in nature. It was also soluble in acetone, tetrahydrofuran, dimethylformamide, dimethylsulfoxide, chloroform, p-dioxane, methylene chloride and methyl alcohol. It was insoluble in butyl acetate, methyl isobutyl ketone, toluene, perchloroethylene, methyl chloroform, petroleum spirits and isopropanol. The I.R. spectrum of the above polymer supports the proposed structure of an allyl poly(EO)$_{11}$-allyl alcohol polysulfone. The polymer decomposed upon melting at 175–185° C. and had a peak molecular weight of 75,000 with a broad molecular weight distribution.

Example 4

In a manner similar to Example 3, 1.60 moles allyl alcohol was added dropwise over a 35-minute period instead of 0.40 moles as used in Example 3. A slight exotherm was observed and the viscosity of the solution increased noticeably. After 24 hours reaction time the polymeric solution was stripped free of residual $SO_2$ under vacuum. The final product was a white, viscous liquid, very tacky in nature. The product was water-sensitive but not water soluble. This product was soluble in tetrahydrofuran, dimethylformamide, dimethylsulfoxide, chloroform, p-dioxane, methylene chloride and methyl alcohol. It was insoluble in acetone, butyl acetate, methyl isobutyl ketone, toluene, perchloroethylene, methyl chloroform, petroleum ether and isopropanol.

The I.R. spectrum of the above polymer supports the proposed structure of an allyl poly(EO)$_{11}$-allyl alcohol polysulfone. The elemental analysis also supports a polysulfone terpolymer consisting of 2 moles allyl alcohol to 1 mole allyl poly(EO).

Theory (percent): S, 11.3; C, 43.7; O, 37.6; H, 7.3.
Actual (percent): S, 6.9; C, 42.3; O, 34.6; H, 9.5.

The polymer decomposed upon melting at 185°–195° C. and had a peak molecular weight of 72,000 with a broad molecular weight distribution.

Example 5

In a manner similar to Example 3, 0.8 moles of allyl alcohol was added dropwise over a 50 minute period instead of 0.40 moles as used in Example 3. The polymer was recovered in the same manner as before and has the same solubility in the above mentioned solvents.

The peak molecular weight for this polymer as measured by gel permeation chromatography was 75,000 with a broad molecular weight distribution.

Example 6

A three liter resin kettle was charged with 1000 mls. of Chlorothene NU (a commercial solvent comprising about 99.5% methyl chloroform with about 0.5% dioxane). This solvent was saturated with sulfur dioxide by bubbling it in overnight at 0.8 grams per minute at 23° C. with stirring at 250 r.p.m. Then, 600 mls. of monoallyl ether of polypropylene glycol having an average molecular weight of about 600 was added to the kettle. This was followed by 12 mls. of Lupersol 11 which was added in two 6 ml. portions. The temperature rose about 3° C. during the 30 minutes following the last catalyst addition and slowly fell back to 20° C.

After 16 hours of stirring at the above speed, the $SO_2$ was removed by vacuum stripping and the polymer recovered.

It was found that the polymer was insoluble in water but soluble in butyl acetate, acetone, tetrahydrofuran, dimethylformamide, methyl isobutyl ketone, dimethyl sulfoxide, chloroform, methanol and isopropyl alcohol.

Infrared analysis of the polymer confirmed the fact that the polymer had a very high concentration of propylene oxide and about 3–5% of sulfur dioxide.

Example 7

The process of Example 6 was repeated using 1000 mls. of methanol. Substantially the same results were obtained.

I claim:
1. A random equimolar copolymer of sulfur dioxide and compounds selected from the group consisting of
   (a) monoallyl ethers of polyoxyethylene glycols having an average molecular weight in the range from 150 to 1500,
   (b) a mixture of (a) and allyl alcohol wherein the mol ratio of allyl alcohol to (a) ranges from about 1:2 to about 2:1 and
   (c) monoallyl ethers of polyoxypropylene glycols having an average molecular weight in the range from 175 to 1000.
2. The copolymer of claim 1 wherein the compounds are monoallyl ethers of polyoxyethylene glycols having an average molecular weight in the range from 250 to 1000.

3. The copolymer of claim 2 wherein the monoallyl ether of polyoxyethylene glycols has an average molecular weight of 500.

4. The copolymer of claim 1 wherein the compounds are monoallyl ethers of polyoxypropylene glycols having an average molecular weight in the range from 175 to 1000.

5. The copolymer of claim 1 wherein the compounds are a mixture of monoallyl ethers of polyoxyethylene glycols having an average molecular weight in the range from 150 to 1500 and allyl alcohol wherein the mol ratio of allyl alcohol to said monoallyl ethers ranges from about 1:10 to about 1:0.5.

References Cited

UNITED STATES PATENTS

| | | | |
|---|---|---|---|
| 3,308,102 | 3/1967 | Wilson | 260—79.3 A |
| 3,442,790 | 5/1969 | Burkard | 208—28 |
| 3,563,961 | 2/1971 | Pickle | 260—78.5 |

JOSEPH L. SCHOFER, Primary Examiner

C. A. HENDERSON, Jr., Assistant Examiner

U.S. Cl. X.R.

117—122; 156—327